US008649788B1

(12) United States Patent
Paczkowski et al.

(10) Patent No.: US 8,649,788 B1
(45) Date of Patent: Feb. 11, 2014

(54) DYNAMIC WIRELESS TRANSCEIVER SELECTION IN A WIRELESS COMMUNICATION DEVICE

(75) Inventors: Lyle Walter Paczkowski, Mission Hills, KS (US); Mohammed Ghouse Mohiuddin, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/572,913

(22) Filed: Aug. 13, 2012

(51) Int. Cl.
*H04W 4/00* (2009.01)
*H04W 36/00* (2009.01)
*H04M 1/00* (2006.01)

(52) U.S. Cl.
USPC ............ 455/432.1; 455/435.3; 455/436; 455/553.1; 455/574; 370/331; 370/338

(58) Field of Classification Search
USPC ............ 455/436, 435.2, 574, 418–420, 455/432.1–444, 550.1–553.1; 370/331, 338
See application file for complete search history.

(56) References Cited

U.S. PATENT DOCUMENTS

| 7,593,365 | B1* | 9/2009 | Delker et al. ............... 370/328 |
| 7,603,119 | B1 | 10/2009 | Durig et al. |
| 7,702,329 | B1 | 4/2010 | Durig et al. |
| 7,894,812 | B1 | 2/2011 | Durig et al. |
| 7,969,366 | B2 | 6/2011 | Suri et al. |
| 7,990,912 | B2 | 8/2011 | Nix, Jr. et al. |
| 8,228,870 | B1 | 7/2012 | Sigg et al. |
| 2007/0183394 | A1 | 8/2007 | Khandelwal et al. |
| 2009/0017826 | A1* | 1/2009 | Shaheen ...................... 455/442 |
| 2009/0245176 | A1 | 10/2009 | Balasubramanian et al. |
| 2010/0214989 | A1* | 8/2010 | Pippert et al. ................ 370/328 |
| 2012/0077506 | A1* | 3/2012 | Wietfeldt et al. ............. 455/450 |
| 2012/0220337 | A1* | 8/2012 | Conway et al. ............ 455/553.1 |

OTHER PUBLICATIONS

U.S. Appl. No. 13/464,054, filed May 4, 2012.

* cited by examiner

*Primary Examiner* — Vladimir Magloire
*Assistant Examiner* — Michael Mapa

(57) ABSTRACT

Embodiments disclosed herein provide systems and methods for dynamically selecting a wireless transceiver in a wireless communication device. In a particular embodiment, a method operating a wireless communication device having multiple wireless transceivers provides exchanging wireless media communications with a first communication network using a first one of the wireless transceivers. The method further provides processing a data structure of access connections and instructions to select a wireless data connection in a second communication network, wherein the instructions are associated with a wireless data service of the second communication network in the data structure, and processing one of the instructions to disable the first wireless transceiver. The method further provides exchanging additional wireless media communications with the second communication network using a second one of the wireless transceivers.

20 Claims, 4 Drawing Sheets

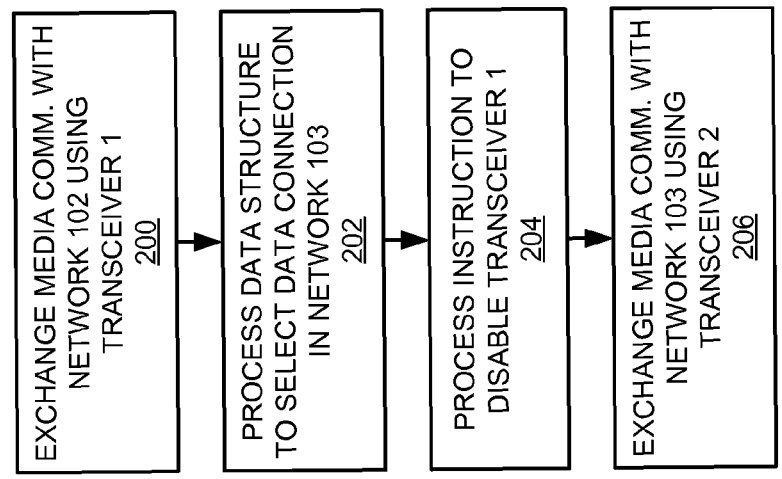
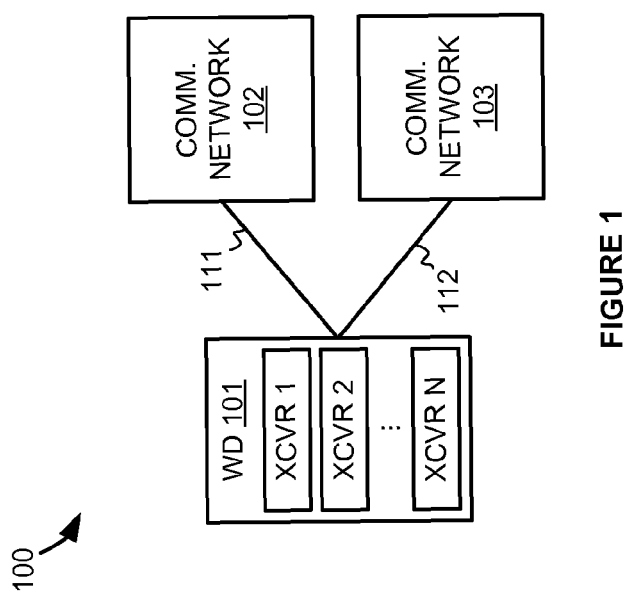

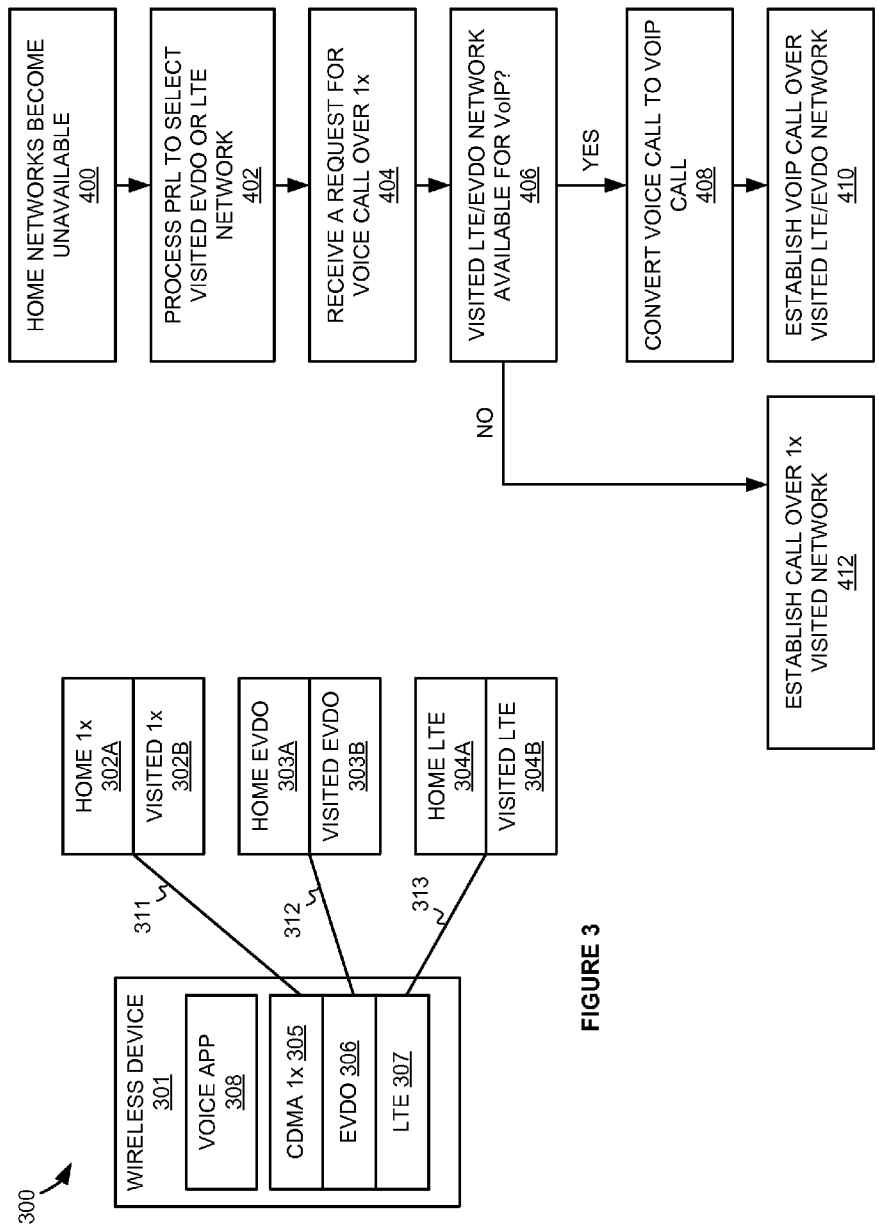

DYNAMIC WIRELESS TRANSCEIVER SELECTION IN A WIRELESS COMMUNICATION DEVICE

TECHNICAL BACKGROUND

Typically, a wireless device communicates with a home wireless network that is associated with the wireless device. For example, the owner of the wireless device may be a customer of a specific home wireless network operator that operates the home wireless network. However, in some circumstances, such as the wireless device being outside the coverage area of the home wireless network, the wireless device may not be able to communicate with the home wireless network. During these circumstances, the wireless device may be able to communicate with visited wireless networks, which are not operated by the home wireless network operator, by roaming onto those networks.

In order to roam on a visited wireless network, the wireless device may be provided with a preferred roaming list (PRL). The PRL provides information that the wireless device uses to connect with access nodes of the visited wireless networks. The information may include communication frequencies, such as pilot frequencies, for the access nodes on the visited wireless networks and any other information that the wireless device needs to find, register, and exchange communications with an access node on a visited wireless network.

Although, while the PRL provides the wireless device with the capability of exchanging communications over a visited wireless network, the operator of the visited wireless network may charge the home wireless network operator for the wireless device doing so. Moreover, the visited network operator may charge different fees for visited network resource usage depending on the type of visited wireless network on which the wireless device is roaming.

OVERVIEW

Embodiments disclosed herein provide systems and methods for dynamically selecting a wireless transceiver in a wireless communication device. In a particular embodiment, a method operating a wireless communication device having multiple wireless transceivers provides exchanging wireless media communications with a first communication network using a first one of the wireless transceivers. The method further provides processing a data structure of access connections and instructions to select a wireless data connection in a second communication network, wherein the instructions are associated with a wireless data service of the second communication network in the data structure, and processing one of the instructions to disable the first wireless transceiver. The method further provides exchanging additional wireless media communications with the second communication network using a second one of the wireless transceivers.

BRIEF DESCRIPTION OF THE DRAWINGS

FIG. 1 illustrates a wireless communication system for dynamically selecting a wireless transceiver in a wireless communication device.

FIG. 2 illustrates the operation of the wireless communication system for dynamically selecting a wireless transceiver in a wireless communication device.

FIG. 3 illustrates a wireless communication system for dynamically selecting a wireless transceiver in a wireless communication device.

FIG. 4 illustrates the operation of the wireless communication system for dynamically selecting a wireless transceiver in a wireless communication device.

DETAILED DESCRIPTION

Figure 5:
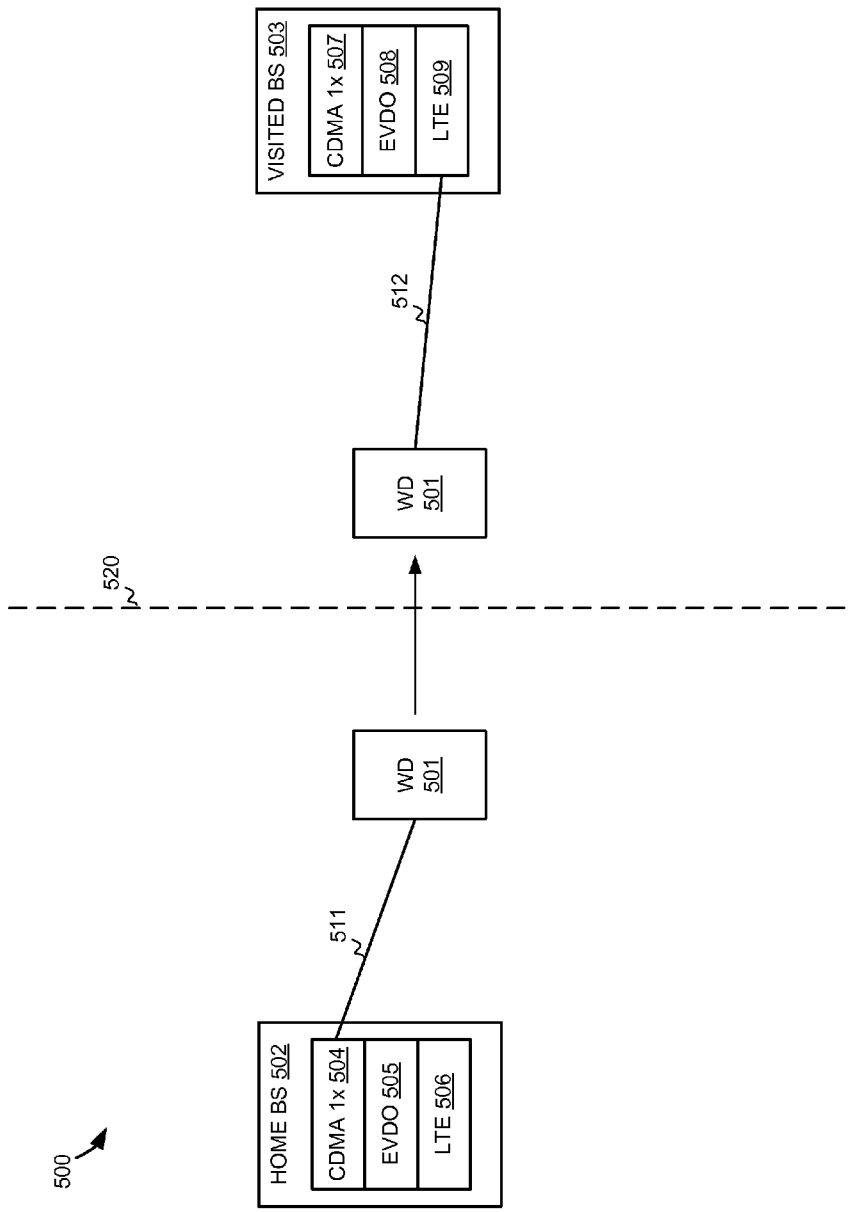
FIG. 5 illustrates a wireless communication system for dynamically selecting a wireless transceiver in a wireless communication device.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates wireless communication system 100. Wireless communication system 100 includes wireless communication device 101, communication network 102, and communication network 103. Wireless communication device 101 and communication network 102 communicate over wireless link 111. Wireless communication device 101 and communication network 103 communicate over wireless link 112.

In operation, wireless device 101 includes transceivers 1-N that allow wireless device 101 to communicate with multiple wireless communication networks. Each transceiver 1-N may include one or more amplifiers, filters, RF modulators, signal processing circuitry, antennas, or other elements used for exchanging wireless communications. These transceiver elements may be shared among multiple transceivers. Each transceiver 1-N may use a different protocol in order to communicate with a different wireless network. Each of the different wireless networks may be operated by the same wireless network operator or by different wireless network operators. Moreover, it is common for one wireless network operator to operate multiple wireless networks with each wireless network using a different protocol.

For example, transceivers 1, 2, and 3 may allow wireless device 101 to communicate with second generation (2G), third generation (3G), and fourth generation (4G) networks, respectively. The owner of wireless device 101 may be a customer of a home wireless network operator that operates, or provides access to, a wireless network of each generation. Accordingly, when wireless device 101 is exchanging communications with one of the 2G, 3G, or 4G networks operated by the home wireless network operator, wireless device 101 is communicating with one of the home wireless networks associated with wireless device 101.

In some cases, at least one of the home wireless networks may not be available to wireless device 101 and wireless device 101 may instead be able to exchange communications with a visited wireless network that is operated by a visited wireless network operator. The visited network operator is a network operator of which the owner of wireless device 101 is not a customer. Wireless device 101 may exchange communications with the visited wireless network using one of the same protocols used with the home wireless networks.

When communicating with one of these visited wireless networks, wireless device 101 is considered to be roaming.

Typically, in order for wireless device 101 to exchange communications with a visited wireless network, the home wireless network operator maintains roaming agreements with the visited wireless network operator. These roaming agreements usually involve the home wireless network operator paying the visited wireless network operator for the resources used by wireless device 101 and by other wireless devices that roam on the visited wireless networks from the home wireless networks. For example, the visited wireless network operator may charge the home wireless network operator a monetary amount per unit of bandwidth used by a wireless device on a visited wireless network.

In many roaming agreements, the usage fee varies depending on the visited network that is used. For example, a usage fee for a visited 2G network may be higher than a usage fee for a visited 3G or 4G network.

FIG. 2 illustrates the operation of wireless communication system 100 for dynamically selecting a wireless transceiver in wireless device 101. In operation, wireless device 101 exchanges wireless media communications with communication network 102 using wireless transceiver 1 in wireless device 101 (step 200). The media communications may be for any type of application executing on wireless device 101. The applications may include voice call, video call, email, audio/video player, web browser, social networking, or any other application. The media may therefore be call data, email messages/attachments, audio/video files, web pages, pictures, text messages, or any other type of data. Communication network 102 may be a home or a visited wireless communication network for wireless device 101.

A data structure of access connections and instructions is processed to select a wireless data connection in communication network 103, wherein the instructions are associated with the wireless data service of communication network 103 in the data structure (step 202). While described as one data structure, the access connections and the instructions may be stored separately within the data structure. For example, the access connections may be part of a preferred roaming list (PRL) and the instructions may be stored separately though still corresponding to the information in the PRL. Alternatively, the instructions may be listed in the PRL corresponding to the data service provided by a given access node.

The access connections in the data structure may provide wireless device 101 with nearby access nodes for both communication network 102 and communication network 103. As wireless device 101 physically moves about, wireless device 101 may need to change access nodes to maintain wireless connectivity. Thus, the data structure provides wireless device 101 with access node information, such as pilot signal frequencies, for access nodes within the area of wireless device 101. The access connections may further indicate what type of network is associated with each access connection, such as 2G, 3G, or 4G. Accordingly, wireless device 101 may select an access connection based on the data service corresponding to the wireless network type(s) of communication network 103.

The instructions in the data structure may be instructions necessary for wireless device 101 to select a data service of communication network 103. Alternatively, the data structure may be ordered in such a manner that wireless device 101 selects a certain data service of communication network 103 before selecting another, as may be the case if the data structure is a PRL. The data service may be related to the type of communication networks supplied by communication network 103. For example, one data service may correspond to a 2G network of communication network 103 while another data service may correspond to a 3G network of communication network 103.

The instructions may include a command to select and use a second incident of wireless transceivers 1-N of wireless device 101 that corresponds to the selected data service to exchange media communications. In one embodiment, wireless device 101 may default to using one of transceivers 1-N and the instructions override that default. The instructions may need to modify the media in some manner to make the media suitable for the selected data service before exchanging the media over the selected transceiver.

One of the instructions is processed to disable wireless transceiver 1 (step 204). For example, the instructions may include application programming interface (API) calls to an API of an operating system executing on wireless device 101, which in turn disables wireless transceiver 1. Once wireless transceiver 1 is disabled, wireless device 101 exchanges additional wireless media communications with communication network 103 using a second one of wireless transceivers 1-N (step 206).

In an example, processing the data structure indicates to wireless device 101 that a data service using wireless transceiver 2 should be used to exchange communications with communication network 103. The instructions associated with the indicated data service instruct wireless device 101 to disable at least transceiver 1 so that media communications can be exchanged with communication network 103 using transceiver 2. Transceiver 1 may need to be disabled because wireless device 101 will otherwise default to using transceiver 1 for certain types of communications.

Advantageously, using transceiver 2 to access a data service on communication network 103 may be more cost effective, or otherwise beneficial, than if wireless device 101 continued to use transceiver 1 for data service on communication network 103.

Referring back to FIG. 1, wireless communication device 101 comprises Radio Frequency (RF) communication circuitry and one or more antennas. The RF communication circuitry forms transceivers 1-N and typically includes one or more amplifiers, filters, modulators, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Communication networks 102 and 103 comprise network elements that provide communications services to wireless device 101 through wireless access nodes. Communication networks 102 and 103 may comprise switches, base stations, Internet routers, network gateways, application servers, computer systems, communication links, or some other type of communication equipment—including combinations thereof.

Wireless links 111 and 112 use the air or space as the transport media. Wireless links 111 and 112 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

FIG. 3 illustrates wireless communication system 300. Wireless communication system 300 includes wireless communication device 301, home CDMA one times Radio Transmission Technology (1xRTT) network 302A, visited CDMA 1xRTT network 302B, home EVDO network 303A, visited EVDO network 303B, home LTE network 304A, and visited LTE network 304B. Wireless communication device 301 includes CDMA 1xRTT transceiver 305, EVDO transceiver 306, and LTE transceiver 307. Wireless device 301 further includes voice call application 308 that executes on a processor system in wireless device 301 to provide a user of wireless communication device 101 with voice call functionality.

CDMA 1xRTT transceiver 305 allows wireless device 301 to exchange CDMA 1xRTT communications over wireless link 311 with either home 1× network 302A or visited 1× network 302B. EVDO transceiver 306 allows wireless device 301 to exchange EVDO communication over wireless link 312 with either home EVDO network 303A or visited EVDO network 303B. LTE transceiver 307 allows wireless device 301 to exchange LTE communications over wireless link 313 with either home LTE network 304A or visited LTE network 304B.

Each of wireless transceivers 305-307 may be located on a single transceiver chip or may be divided among multiple transceiver chips. Similarly, each transceiver may use a single antenna within wireless device 301 to exchange communications or may use different antennas depending on carrier frequency needs of wireless networks 302-304.

Home networks 302A-304A are operated by a home wireless network operator for wireless device 301 and visited networks 302B-304B are operated by a visited wireless network operator that provides wireless device 301 with roaming capability. While home networks 302A-304A are shown together with visited networks 302B-304B for the purposes of illustrating that wireless device 301 can communicate with both sets of networks, it should be understood that the two sets of networks may use different base stations and provide different wireless signal coverage areas.

FIG. 4 illustrates the operation of wireless communication system 300 for dynamically selecting a wireless transceiver in wireless device 301. In operation, home wireless networks 302A-304A become unavailable to wireless device 301 (step 400). The home networks 302A-304A may become unavailable due to wireless device 301 moving outside of the coverage area of home networks 302A-304A or for any other reason that wireless device 301 may not be able to communicate with home networks 302A-304A.

When home networks 302A-304A are unavailable, wireless device 301 processes a preferred roaming list (PRL) for wireless device 301 to determine an access node and network type of visited networks 302B-304B to which wireless device 301 should connect (step 402). The PRL is ordered and contains instructions necessary for wireless device 301 to select a visited network 302B-304B that is preferred by the home wireless network operator. A visited network may be preferred over another visited network due to the cost incurred by the home wireless network operator for wireless device 301's use of the visited network. PRL updates may be received periodically so that this information remains current on wireless device 301.

In this embodiment, the PRL indicates that either visited EVDO network 303B and visited LTE network 304B should be used by wireless device 301. In order to force wireless device 301 to use either visited EVDO network 303B and visited LTE network 304B, the PRL includes instructions for wireless device 301 to disable 1× transceiver 305. With 1× transceiver 305 disabled, wireless device 301 must communicate using either visited EVDO network 303B and visited LTE network 304B even though wireless device 301 may be configured to use 1× transceiver 305 by default.

In alternative embodiments, the PRL may indicate that visited EVDO network 303B and visited LTE network 304B are not available. Therefore, wireless device 301 will be instructed by the PRL to use 1× transceiver 305 to communicate with visited 1× network 302B despite any preference by the home wireless network operator to the contrary.

After wireless device 301 uses EVDO transceiver 306 or LTE transceiver 307 to connect with visited EVDO network 303B or visited LTE network 304B, a user of wireless device 301 uses voice call application 308 to initiate a voice call over a digital voice channel on 1xRTT (step 404). The initiation of the voice call may be to generate an outgoing voice call or accept an incoming voice call.

Upon receiving the voice call request, a determination is made as to whether visited EVDO network 303B or visited LTE network 304B are available to exchange voice over Internet protocol (VoIP) communications or some other type of packet voice protocol (step 406). Either network may be available if either network can provide enough wireless communication bandwidth for a VoIP call. The determination may be made by voice call application 308 or by some other set of instructions (software, firmware, operating system element, etc.) executing on wireless device 301. The determination may be made by making an application programming interface (API) call to an element of the operating system for wireless device 301 that returns a value indicating whether visited EVDO network 303B or visited LTE network 304B is capable of handling the VoIP call.

If it is determined that visited EVDO network 303B or visited LTE network 304B are available to exchange VoIP communications, the voice call is converted to a VoIP call or some other type of packet voice call (step 408). Voice call application 308 may perform the conversion itself or may rely on some other set of instructions (software, firmware, operating system element, etc.) executing on wireless device 301. The VoIP call is then established over visited EVDO network 303B or visited LTE network 304B using either EVDO transceiver 306 or LTE transceiver 307 (step 410). The same or different instructions that converted the voice call to VoIP may direct the wireless device 301 to disable other wireless transceivers that will not be used for the call. For example, if visited EVDO network 303B selected for the call, then the instructions will disable LTE transceiver 307 in order to force the call to be established using EVDO transceiver 306. Alternatively, the instructions may use some method other than disabling transceivers to direct the call over EVDO transceiver 306.

However, if it is determined that visited EVDO network 303B or visited LTE network 304B are not available to exchange VoIP communications, then wireless device 301 references the PRL again to determine whether visited 1× network 302B is available. Upon determining that visited 1× network 302B is available, wireless device 301 enables 1× transceiver 305 and establishes the voice call over visited 1× network 302B (step 412). The PRL may include the instructions necessary to enable 1× transceiver 305 when visited EVDO network 303B or visited LTE network 304B are not available to exchange VoIP communications.

Advantageously, converting the call to a VoIP call over EVDO or LTE when wireless device 301 is roaming, the home wireless network operator may avoid the increased cost of using the visited network operator's 1xRTT network.

FIG. 5 illustrates wireless communication system 500. Wireless communication system 500 includes wireless communication device 501, home base station 502, and visited base station 503. Home base station 502 includes CDMA 1xRTT transceiver 504, EVDO transceiver 505, and LTE transceiver 506. Visited base station 503 includes CDMA 1xRTT transceiver 507, EVDO transceiver 508, and LTE transceiver 509. Though not illustrated in detail, similar to wireless communication device 301, wireless communication device 501 includes a CDMA 1xRTT transceiver, EVDO transceiver, and LTE transceiver for communicating with corresponding transceivers in base stations 502 and 503. Similarly, base stations 502 and 503 may be base stations of home wireless networks 302A-304A and visited wireless networks 302B-304B, respectively. While each of base stations 502 and 503 are shown to include three transceivers, the transceivers may be separated amongst multiple base stations.

In operation, wireless device 501 exchanges communications with home base station 502 when wireless device 501 is within the wireless signal coverage area of home base station 502. However, when wireless device 501 is unable to communicate with home base station 502, then wireless device 501 may exchange communications with visited base station 503 on a roaming basis. Wireless device 301 may roam on visited base station 503 because home base station 502 is out of signal range, because home base station 502 is malfunctioning, or for any other reason that wireless device 501 would need to use a visited wireless network.

When not roaming, wireless device 501 is able to use any of the transceivers on home base station 502 for exchanging communications. In particular, for digital voice calls, wireless device 501 exchanges voice communications over wireless link 511 with CDMA 1xRTT transceiver 504. However, once wireless device 501 crosses threshold 520 and can no longer exchange communications with home base station 502, then wireless device 501 exchanges communications with visited base station 503 to maintain wireless connectivity.

To exchange communications with visited base station 503, wireless device 501 references a PRL stored on wireless device 501. The PRL provides the information necessary for wireless device 501 to search for and exchange communications with various transceivers. The PRL is ordered in such a way as to direct wireless device 501 to exchange communications with EVDO transceiver 508 or LTE transceiver 509. Thus, wireless device 501 will search for wireless signals from either EVDO transceiver 508 and/or LTE transceiver 509 before looking for wireless signals from 1x transceiver 507. Upon determining that wireless device 501 is able to exchange communications with either or both of EVDO transceiver 508 or LTE transceiver 509, wireless device 501 uses instructions included in the PRL to disable the 1x transceiver in wireless device 501 so as to force communications over either EVDO transceiver 508 or LTE transceiver 509. Alternatively, the instructions in the PRL may direct wireless device 501 to disable its 1x transceiver before wireless device 501 searches for EVDO transceiver 508 or LTE transceiver 509 in order to force wireless device 501 to search for those transceivers over 1x transceiver 507. In yet a further alternative, the PRL may not include information necessary for wireless device 501 to search for and exchange communications with 1x transceiver 507.

When exchanging voice communications with visited base station 503, wireless device 501 determines whether visited wireless base station 503 is capable of supporting a VoIP call. In this example, wireless device 501 selects LTE transceiver 509 for VoIP communications. Wireless device 501 may have selected LTE transceiver 509 due to increased data speed of LTE transceiver 509, lower data bandwidth cost to the home wireless network operator for the use of LTE transceiver 509, or for some other reason.

Wireless device 501 registers to use LTE transceiver 509, if wireless device 501 had not done so already. Then wireless device 501 is able to convert any voice call that would otherwise have been exchanged over CDMA 1xRTT transceiver 507 to VoIP and exchange VoIP communications over LTE transceiver 509 instead. The instructions necessary for wireless device 501 to convert voice calls to VoIP and transfer them over LTE may be included within the PRL, included with a voice call application, or may be stored elsewhere in a storage system of wireless device 501.

Figure 6:
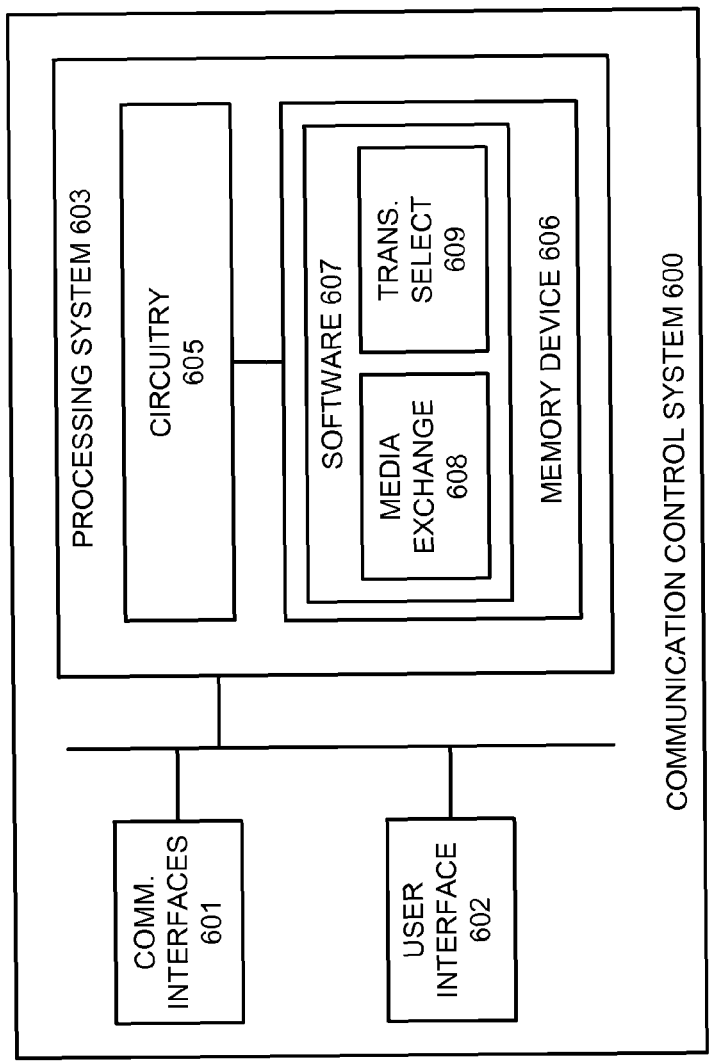
FIG. 6 illustrates a wireless communication device for dynamically selecting a wireless transceiver in a wireless communication device.

FIG. 6 illustrates wireless communication device 600. Wireless communication device 600 is an example of wireless communication devices 101 and 301, although devices 101 and 301 could use alternative configurations. Wireless communication device 600 comprises wireless communication interface 601, user interface 602, and processing system 603. Processing system 603 is linked to wireless communication interface 601 and user interface 602. Processing system 603 includes processing circuitry 605 and memory device 606 that stores operating software 607. Wireless communication device 600 may include other well-known components such as a battery and enclosure that are not shown for clarity. Wireless communication device 600 may be a telephone, computer, e-book, mobile Internet appliance, media player, game console, wireless network interface card, or some other wireless communication apparatus—including combinations thereof.

Wireless communication interface 601 comprises RF communication circuitry and an antenna. The RF communication circuitry typically includes an amplifier, filter, RF modulator, and signal processing circuitry. Wireless communication interface 601 may also include a memory device, software, processing circuitry, or some other communication device. Wireless communication interface 601 further comprises a plurality of wireless transceivers that may use various protocols, such as CDMA, EVDO, WIMAX, GSM, LTE, WIFI, HSPA, or some other wireless communication format.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes media exchange module 608 and transceiver selection module 609. Operating software 607 may further include an operating system, utilities, drivers, network interfaces, applications, or some other type of software. When executed by processing circuitry 605, operating software 607 directs processing system 603 to operate wireless communication device 600 as described herein.

In particular, media exchange module 608 directs processing system 606 to exchange wireless media communications with a first communication network using a first one of the wireless transceivers of communication interface 601. Transceiver selection module 609 directs processing system 606 to process a data structure of access connections and instructions to select a wireless data connection in a second communication network, wherein the instructions are associated with a wireless data service of the second communication network in the data structure, and process one of the instructions to disable the first wireless transceiver. Media exchange module 608 further directs processing system 603 to exchange additional wireless media communications with the second communication network using a second one of the wireless transceivers of communication interface 601.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device having multiple wireless transceivers, the method comprising: exchanging wireless media communications with a first communication network using a first one of the wireless transceivers; processing a preferred roaming list (PRL), wherein the PRL includes access connections and instructions to select a wireless data connection in a second communication network, wherein the instructions are associated with a wireless data service of the second communication network in the PRL; processing one of the instructions to disable the first wireless transceiver, wherein the one of the instructions directs the wireless communication device to disable the first wireless transceiver; in response to disabling the first wireless transceiver, exchanging additional wireless media communications with the second communication network using a second one of the wireless transceivers.

2. The method of claim 1, wherein the list comprises a preferred roaming list (PRL) that includes the access connections and instructions.

3. The method of claim 1, wherein the associated instructions are application programming interface (API) calls to an operating system of the wireless communication device.

4. The method of claim 1, wherein the first communication network comprises a home wireless network and the second communication network comprises a visited wireless network.

5. The method of claim 1, wherein processing the PRL is performed in response to leaving a coverage area of the first communication network.

6. The method of claim 1, wherein the first one of the wireless transceivers comprises a code division multiple access (CDMA) one times Radio Transmission Technology (1xRTT) transceiver.

7. The method of claim 1, wherein the first one of the wireless transceivers comprises a Global System for Mobile Communications (GSM) transceiver.

8. The method of claim 1, wherein the second one of the wireless transceivers comprises a code division multiple access (CDMA) Evolution-Data Only (EVDO) transceiver.

9. The method of claim 1, wherein the second one of the wireless transceivers comprises a Long Term Evolution (LTE) transceiver.

10. The method of claim 1, wherein the media communications comprise a voice call.

11. A wireless communication device, comprising:
a first wireless transceiver configured to exchange wireless media communications with a first communication network; a processing system configured to process a preferred roaming list (PRL), wherein the PRL includes access connections and instructions, to select a wireless data connection in a second communication network, wherein the instructions are associated with a wireless data service of the second communication network in the PRL, and, in response, processing one of the instructions to disable the first wireless transceiver; a second wireless transceiver configured to exchange additional wireless media communications with the second communication network over the wireless data connection.

12. The wireless communication device of claim 11, wherein the list comprises a preferred roaming list (PRL) that includes the access connections and instructions.

13. The wireless communication device of claim 11, wherein the associated instructions are application programming interface (API) calls to an operating system of the wireless communication device.

14. The wireless communication device of claim 11, wherein the first communication network comprises a home wireless network and the second communication network comprises a visited wireless network.

15. The wireless communication device of claim 11, wherein the processing system is configured to process the PRL in response to leaving a coverage area of the first communication network.

16. The wireless communication device of claim 11, wherein the first one of the wireless transceivers comprises a code division multiple access (CDMA) one times Radio Transmission Technology (1xRTT) transceiver.

17. The wireless communication device of claim 11, wherein the first one of the wireless transceivers comprises a Global System for Mobile Communications (GSM) transceiver.

18. The wireless communication device of claim 11, wherein the second one of the wireless transceivers comprises a code division multiple access (CDMA) Evolution-Data Only (EVDO) transceiver.

19. The wireless communication device of claim 11, wherein the second one of the wireless transceivers comprises a Long Term Evolution (LTE) transceiver.

20. The wireless communication device of claim 11, wherein the media communications comprise a voice call.

* * * * *